United States Patent [19]

Gagnon

[11] 4,399,794
[45] Aug. 23, 1983

[54] CARBURETION SYSTEM

[76] Inventor: David C. Gagnon, 227 Whipple St., Fall River, Mass. 02721

[21] Appl. No.: 316,340

[22] Filed: Oct. 29, 1981

[51] Int. Cl.³ .......................................... F02M 31/00
[52] U.S. Cl. ................... 123/523; 123/545; 261/84; 261/89; 261/144
[58] Field of Search ................... 123/523, 545, 546; 261/84, 88, 89, 144, 145; 48/180 S

[56] References Cited

U.S. PATENT DOCUMENTS

| | | | |
|---|---|---|---|
| 249,163 | 11/1881 | DeWitt | 261/84 |
| 1,153,077 | 9/1915 | Hippel | 261/88 |
| 1,218,867 | 3/1917 | Johnson | 123/545 |
| 1,583,584 | 5/1926 | Donning | 123/545 |
| 1,731,924 | 10/1929 | Engelke | 261/89 |
| 1,746,439 | 2/1930 | Murrer | 261/89 |
| 2,119,922 | 6/1938 | Lutz | 261/84 |
| 2,186,829 | 1/1940 | Haddock | 261/84 |
| 2,319,752 | 5/1943 | Smith | 261/84 |
| 3,701,513 | 10/1972 | Carter | 261/84 |
| 3,991,144 | 11/1976 | Diener | 261/88 |
| 4,267,802 | 5/1981 | Garretson | 123/523 |

Primary Examiner—Ronald H. Lazarus

[57] ABSTRACT

This carburetion system for automobiles serves to increase gasoline mileage greatly, and it consists primarily of a regulator for metering drops of fuel onto a motor-driven fan in a fuel and air mixing chamber. It further includes a heat expansion cylinder connected to the mixing chamber, so as to vaporize the mixture fully and completely by exhaust gases of the engine, prior to the fuel and air gas entering the cylinders of the automobile engine.

2 Claims, 4 Drawing Figures

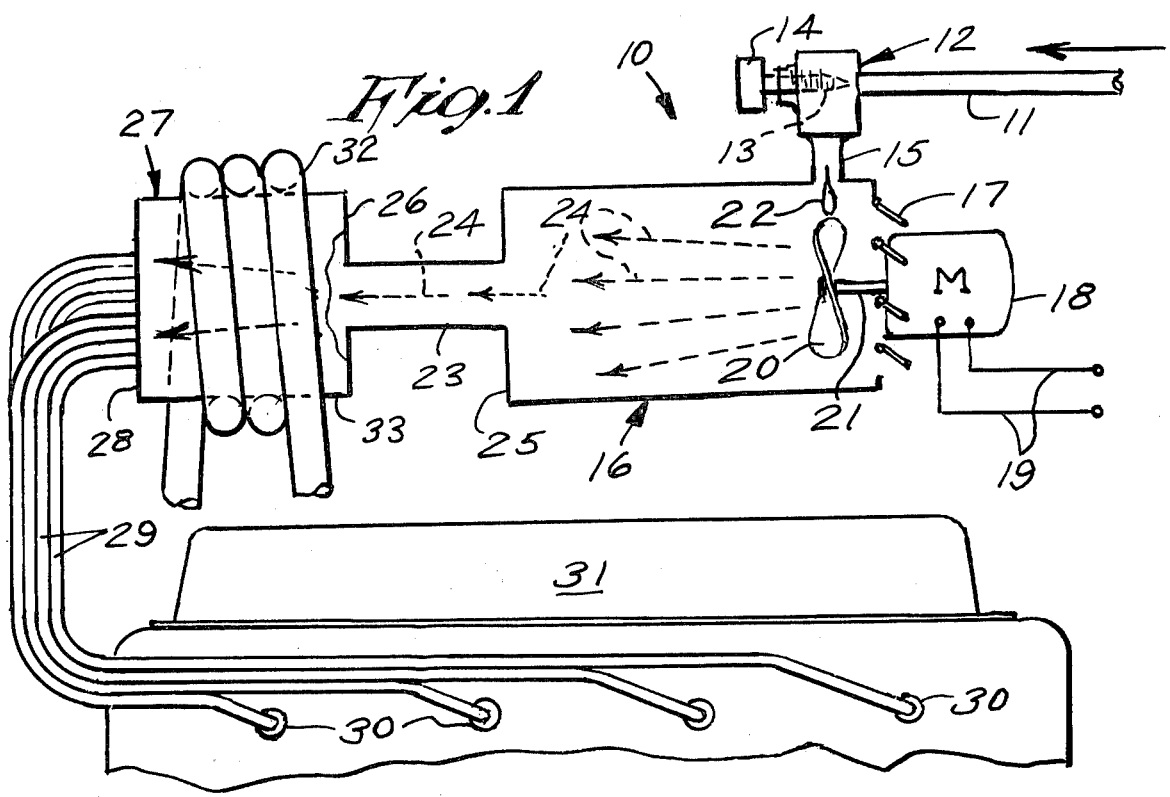
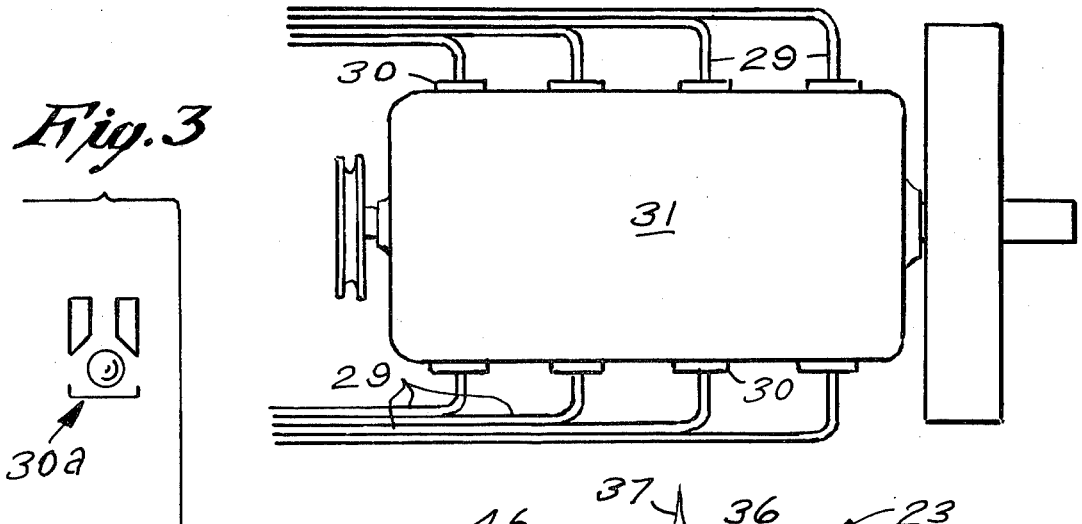
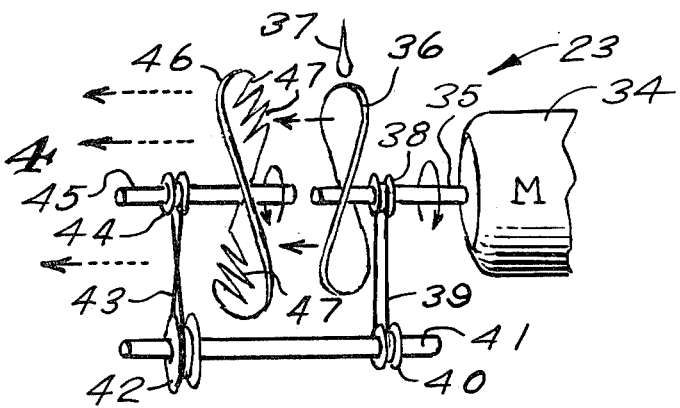

CARBURETION SYSTEM

This invention relates to internal combustion engines, and more particularly, to a carburetion system.

The principal object of this invention is to provide a carburetion system, which will be a new system of introducing a fuel and air mixture into an internal combustion engine.

Another object of this invention is to provide a carburetion system, which will increase gasoline mileage two to three times over that obtained by carburetion systems of the prior art.

Another object of this invention is to provide a carburetion system, which will substantially increase the volumetric efficiency of an internal combustion engine, while simultaneously decreasing air pollution caused when combustion takes place in an engine.

A further object of this invention is to provide a carburetion system, which will employ small cylinder means for expansion of the vapor, and motor and blower means provides for the flow of the mixture for distribution into the cylinders of the engine.

A still further object of this invention is to provide a carburetion system, which will be adaptable to now existing carburetors on internal combustion engines, and the system will be safe in use.

Other objects of the present invention are to provide a carburetion system, which is simple in design, inexpensive to manufacture, rugged in construction, easy to use and efficient in operation.

These, and other objects, will be readily evident, upon a study of the following specification, and the accompanying drawing, wherein:

FIG. 1 is a diagrammatic side elevational view of the present invention, shown in operation;

FIG. 2 is a fragmentary top plan view of the engine shown in FIG. 1;

FIG. 3 is a diagrammatic and broken away ball-check valve, which is installed in the outer end of each of the intake tubes of the invention, and FIG. 4 is a fragmentary perspective view, showing a modified fan unit for the invention.

According to this invention, a system 10 is shown to include a gasoline feed line 11, which is suitably secured to the output side of the fuel pump of a vehicle, not shown. Line 11 is suitably secured to the input side of a regulator 12, and regulator 12 is provided with a threaded needle valve 13, which is terminated by an adjustment knob 14, the combination being common in the art. The output side of regulator 12 is secured, by suitable means, to the neck 15 portion of a cylindric mixing chamber 16, having an air intake vent 17. An electric motor 18 is suitably secured to the exterior of vent 17, by suitable means, not shown, and the wires 19 of motor 18 are secured in the vehicle's electrical system, in a manner common in the art. A fan blade 20, suitably secured to the shaft 21 of motor 18, provides a means of pulling air through vent 17, and simultaneously strikes and breaks up a drop of fuel 22, when it is metered from the regulator 12 into the mixing chamber 16. The resulting mist of fuel 22 and air is forced out of chamber 16 into pipe 23, as is indicated by the arrows 24. Pipe 23 is fixedly secured to end wall 25 of chamber 16, by suitable means, and the opposite end of pipe 23 is similarly secured to an end wall 26 of a heat expansion cylinder 27, the opposite end wall 28 including suitable fitting means, not shown, for connecting to a plurality of tubes or intake lines 29, which are suitably secured, at their opposite ends, to the intake fittings 30 of each of the cylinders in engine 31. A ball-check valve 30a is secured in the ends of lines 29, at the fittings 30, in a manner known in the art, for checking the vapor flow.

A coil of tubing 32 is received on the outer periphery 33 of expansion cylinder 27, and is suitably connected to the engine 31 exhaust pipe, not shown, the heat of the exhaust gases serving as a means of vaporizing the fuel and air mixture, prior to its being introduced into the cylinders of engine 31.

In operation, when the ignition system of engine 31 is turned on, motor 18, being in the circuit, is also turned on, and the fan blade 21 pulls air through the vent 17. When the ignition circuit is closed, the knob 14 is rotated to a pre-set position, which causes a single drop of fuel 22, of approximately one drop per second, to descend onto the fan blade 20, whereupon, the fuel 22 is broken up into a mist in the incoming air. The mist is forced into the heat expansion cylinder 27, and, as the cylinder 27 warms up by the heat of the exhaust gases passing through the tubing 32, the fuel and air mixture is fully vaporized by exhaust heat expansion means.

It shall be noted, that the engine's existing carburetor, when using system 10, has a gasoline line attached to it for the purpose of the accelerator pump; however, all of the other gasoline input openings will be plugged up.

It shall further be recognized, that the ball-check valve 30a in the ends of lines or tubes 29, will open and close perfectly on each intake stroke of each cylinder of the engine 31, due to the differential in pressure caused by the pistons on their downward travel, during the intake events of the engine's operating cycle.

Looking now at FIG. 4 of the drawing, a modified form of fan unit 33, for use in system 10, includes an electric motor 34, suitably wired into the ignition circuit of an engine. The shaft 35 of motor 34 includes a typical fan blade 36, for breaking up drops of fuel 37, and a pulley 38, suitably secured to shaft 35, receives an endless belt 39, which is also carried on a similar pulley 40 fastened to a second shaft 41, which is mounted in a suitable manner within a mixing chamber, not shown. A pulley 42, fastened to the opposite end of shaft 41, receives a belt 43, that is also received on a pulley 44 secured to a third shaft 45, which is in longitudinal alignment with the first shaft 35. A second fan blade 47 is suitably secured to the third shaft 45, and a plurality of cut-outs 47 are included in the oppositely opposed edges of blade 47, for maximum fuel 37 break-up.

In use, motor 34 simultaneously rotates blades 36 and 46, by means of the pulleys 38, 40, 42, and 44, which are connected by their respective endless belts 39 and 43. When each drop of fuel 37 falls onto blade 36, it breaks up into the incoming air being pulled by fan blades 36 and 46. The mist caused is further broken up by the cut-outs 47 in the blade 46, which rotates simultaneously with blade 36, and the blade 46, being larger in diameter, further enhances the break-up of the fuel and air mixture or mist.

While various changes may be made in the detail construction, it is understood that such changes will be within the spirit and scope of the present invention, as is defined by the appended claims.

What is claimed as new is:

1. A carburetion system for internal combustion engines, comprising, in combination, a mixing chamber for mixing fuel and air, a regulator secured to said mixing chamber for metering a quantity of fuel into said mixing chamber, a heat expansion cylinder secured to said mixing chamber for completely vaporizing the fuel and air mixture, and a fan and motor secured in said system, for pulling air into said system to be mixed with said fuel; said mixing chamber being spaced apart from said heat expansion cylinder by a pipe, said pipe being fixedly secured, at one end, to an end wall of said mixing chamber, the opposite end being fixedly secured, in a similar manner, to an end wall of said heat expansion cylinder, which is encompassed within a coil of tubing connected to the exhaust manifold of said internal combustion engine; and the opposite end wall of said heat expansion cylinder including fitting means, which secure a plurality of tubes for the passage of the fuel and air vapor produced in said heat expansion cylinder, and each of said tubes is suitably and removably secured to an intake fitting received in each of the cylinders of said internal combustion engine, and the opposite end wall of said mixing chamber includes a vent fixedly secured thereto by suitable fastening means, said vent having said motor removably secured to its exterior, which is wired into the ignition circuit of said internal combustion engine.

2. The combination according to claim 1, wherein a fan blade is suitably secured to the shaft of said motor, on the interior of said mixing chamber, beneath the output side of said regulator, so as to break up each drop of said fuel when it strikes said fan blade, when it is rotated by said motor, and said fuel and air mixture is forced towards said end wall of said chamber, and into said pipe.

* * * * *